United States Patent [19]

Schubach

[11] 3,740,089

[45] June 19, 1973

[54] ROOF TO SIDE WALL JOINT AREA STRUCTURE FOR TRANSPORTATION TYPE VEHICLES

[75] Inventor: Theodor C. Schubach, Bonita, Calif.

[73] Assignee: Rohr Industries Inc., Chula Vista, Calif.

[22] Filed: Mar. 8, 1972

[21] Appl. No.: 232,821

[52] U.S. Cl. ............................ 296/28 A, 296/137 R
[51] Int. Cl. ............................................. B62d 31/02
[58] Field of Search ................ 296/28 A, 137 R; 52/288; 105/409, 401

[56] References Cited
UNITED STATES PATENTS

| | | | |
|---|---|---|---|
| 1,883,991 | 10/1932 | Ledwinka | 296/28 A |
| 2,735,714 | 2/1956 | Dean | 296/28 A |
| 3,066,621 | 12/1962 | Dean | 296/28 A |
| 3,034,824 | 5/1962 | Schubach | 296/28 A |
| 2,851,965 | 9/1958 | Leriche | 105/409 |

Primary Examiner—Benjamin Hersh
Assistant Examiner—Robert R. Song
Attorney—George E. Pearson

[57] ABSTRACT

In a transportation type vehicle, an extrusion having an arched upper portion has a transversely curved tongue extending from its upper edge, which fits into a correspondingly curved groove provided in the outer, upper edge portion along each side of the vehicle roof structure. The arched upper portion of each extrusion covers and conceals the roof-to-side wall joint on its associated side of the vehicle, and an inwardly extending flange on the lower end of each arched upper portion has latching engagement with a vehicle side wall element. A flange extending outwardly from the lower end of each arched upper portion, and an upstanding flange along the outer edge of each outwardly extending flange provide a rain gutter for runoff water from the roof, while a plate portion extending downwardly, coextensively with the upstanding flange, comprises a top strake for the vehicle side wall.

6 Claims, 1 Drawing Figure

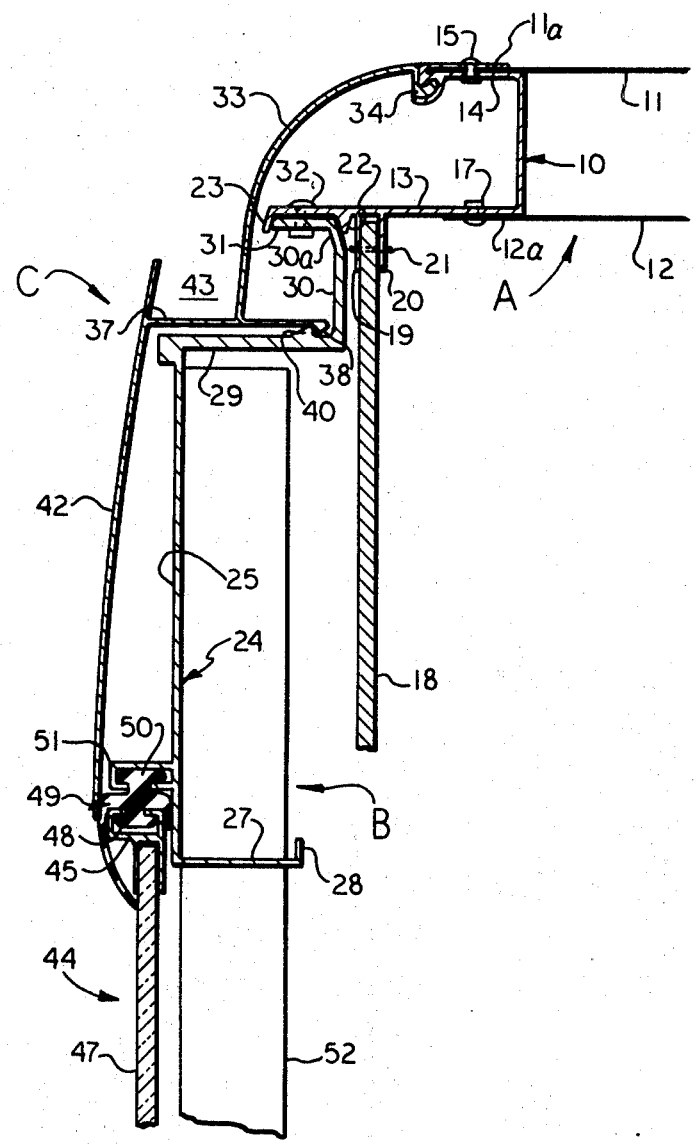

ROOF TO SIDE WALL JOINT AREA STRUCTURE FOR TRANSPORTATION TYPE VEHICLES

BACKGROUND OF THE INVENTION

In the manufacture of transportation type vehicles, such as buses and mass transit cars, it is desirable to join the roof and side walls of each vehicle in a manner which will insure proper interfitting of the parts, and which can be completed in a workmanlike manner by workers working exteriorly of the vehicle. Also, it is desirable to reduce as far as practicable the number and complexity of the operations required to complete the assembly of the roof and side walls, since, as disclosed in my co-pending application Ser. No. 230,689, filed Mar. 1, 1972 it is now preferred to complete all work on the roof and side walls in their respective jigs before assembling them, so that when assembled by workers working exteriorly of the vehicle, the interior of the vehicle is finished, or substantially so. In my prior U.S. Pat. No. 3,034,824, there is shown a corner structure with protective cover for joining the roof and side walls of a knockdown vehicle body.

SUMMARY OF THE INVENTION

A primary objective of the present invention is to provide an improved construction for the roof-to-side wall joint area of a transportation type vehicle. The invention also provides a protective cover for the joint thus formed, said cover having interlocking, weather tight relation with the vehicle structure, providing also an integral rain gutter, and an ornamental and protective top strake for the vehicle.

BRIEF DESCRIPTION OF THE DRAWINGS

The foregoing objectives and advantages of the invention will be apparent from the following description and the accompanying drawings, wherein the single FIGURE of the drawings is a transverse, sectional view through the roof-to-side wall joint area of a transportation type vehicle embodying the invention.

DETAILED DESCRIPTION OF THE DRAWINGS

Referring to the drawing in detail, the roof structure A of a vehicle embodying the present invention comprises an outwardly open, channel shaped extrusion 10 incorporated in each side of the roof structure, the two channel shaped extrusions being connected by an outer roof sheet 11 and lining sheet 12. Both of said sheets, and the extrusions 10 are of suitable material, for example, aluminum.

The lower flange 13 of each channel 10 projects outwardly beyond the upper flange 14 to provide a support for each side of the roof structure A on an associated vehicle side wall B. The edge portion 11a along each side of the outer roof sheet 11 is fitted into a slot provided therefor in the upper side 14 of the associated extrusion 10, and is secured therein by rivets 15. Preferably the edge portions 11a of the outer roof sheet 11 are coated with suitable weather proof sealant, not shown, before being inserted in their respective slots. Each edge portion 12a of the roof lining sheet is secured to the under side of its associated channel extrusion 10 by rivets 17.

A non-metallic air conditioning duct member 18, the structure of which is not important to the present invention, is assembled as part of the roof structure, being fitted between a pair of flanges 19 and 20 formed integrally on the under side of each roof channel lower flange 13, and is retained therebetween by pins 21.

A rib 22 on the under side of the lower channel flange 13, and a downwardly extending flange 23 on the laterally outward end of said flange 13 define channel therebetween, and the sides of the rib 22 and flange 23 defining the sides of this channel diverge downwardly to exert a cam centering effect on the upper end of the side wall B when fitted thereto.

An extrusion 24 comprises the upper structural portion of each vehicle side wall B, the lower portion of each extrusion 24 being of box-like, inwardly open, channel form and comprising an upright outer wall portion 25, a horizontal lower flange 27 with an upturned flange 28 on its inner end, and a horizontal upper flange 29. An upturned flange 30 is provided on the inner end of the upper channel flange 29, and the upper portion 30a thereof slopes outwardly to fit in conforming relation to the outer face of the rib 22. A laterally outwardly extending flange 31 on the upper end of the flange 30 is shaped to fit snugly into the channel between the ribs 22 and 23.

Registering rivet holes are provided in the out-turned flange 31 of each side wall extrusion 24 and the flange 13 fitted to and supported thereon. Rivets 32 are inserted and set in these registering holes, and an extrusion C, which is a combined joint cover, rain gutter, and side wall strake, is latched in position as shown in the drawing.

Each extrusion C comprises an arched upper portion 33 having an upwardly curved tongue 34 extending from its upper edge and fitting in weather tight relation into a correspondingly curved groove provided in the thickened outer edge of the upper flange 14 of each roof structure extrusion 10 in a manner corresponding to that of a similar tongue and groove shown in my U.S. Pat. No. 3,034,824, referred to previously herein. From the lower end of the curved upper portion 33, a flange 37 extends laterally both inwardly and outwardly, and a latch tongue 38, provided on the free inner edge of this flange, is shaped to cam over and engage a latch rib 40 formed on the flange 29 of the side wall extrusion 24, so as to latch the member C in assembled position as shown in the drawing.

The outwardly extending portion of the flange 37 has a generally upright plate 42 formed integrally on the outer end thereof, and extending both upwardly and downwardly therefrom. The upwardly extending portion of this plate 42, together with the outwardly extending portion of the flange 37 and the lower portion of the arched upper portion 33 form a rain gutter 43. A downwardly extending portion of the plate 42 forms an ornamental and serviceable top strake of the car side wall, preferably extending downardly into pressure, sealing engagement with an elastromeric seal 49 provided along the upper ends of the usual vehicle side windows 44.

The specific window structure employed is not a feature of the invention, but, as illustrated, comprises a double channel frame 45 with its inner channel fitted marginally around a usual window glass 47, and an inner rib 48 of the seal member 49 fitted into the outer channel thereof. An outer rib 50 of the seal member 49 is fitted into a channel 51 formed in each side wall extrusion 24, and continuations of the latter channel, not shown, may be provided on the usual mullions or posts 52 between adjacent windows.

The invention provides in a single, easily applied, and relatively inexpensive structure, a protective weatherproof cover for the externally completed roof-to-side wall joints of a transportation type vehicle. It also provides an integral, leak-proof rain gutter, and a strake covering the exterior of the upper portion of each side wall, unmarred by visible fastening means. By installing the members C as a final operation in the construction of the vehicle, the entire upper side portion of the car remains open for external work and inspection until the vehicle is ready to be placed in service. Also, the entire unit C can be readily removed for inspection or maintenance of the parts concealed thereby at any time.

Having thus described my invention, what I claim as new and useful and desire to protect by U. S. Letters Patent is:

1. In a transportation type vehicle comprising a roof structure and a pair of side walls, one along each side of the vehicle, the roof structure resting on and fitted to the side walls, the top of each side wall being secured to the roof structure by an externally completed joint, an upper edge portion of the roof structure having a first sealing element extending therealong, the improvement comprising, an extrusion comprising an arched upper portion covering and concealing said roof-to-side wall joint, a second sealing element extending along the upper edge of the arched portion and fitted in weather tight relation to the first sealing element of the roof structure, a first substantially horizontal plate portion of the extrusion extending transversely across the lower end of the arched upper portion, the inward edge of said first plate portion being in latched engagement with its associated vehicle side wall, the first plate portion extending laterally outwardly beyond the lower end of the arched portion, and a second, upright plate portion of the extrusion extending transversely across an outer portion of the first plate portion, a first portion of the second, upright plate portion extending above the first plate portion and forming, in conjunction with the first plate portion and the lower portion of the arched upper portion of the extrusion, a rain gutter for runoff water from the roof structure, and a second portion of the second, upright plate portion extending below the first portion thereof and comprising a top strake of the vehicle side wall.

2. An extrusion as claimed in claim 1 wherein the first sealing element comprises a transversely curved groove in the upper edge portion of each side of the roof structure, and the second sealing element comprises a transversely curved tongue projecting from the upper edge of the arched upper portion and fitted in conforming relation into the transversely curved groove.

3. An extrusion as claimed in claim 1 wherein a portion of the second plate portion extends downwardly below the first plate portion and comprises a top strake of the vehicle side wall.

4. An extrusion as claimed in claim 3 wherein the entire outer surface of the upright plate portion is smooth and co-extensive.

5. An extrusion as claimed in claim 3 wherein the vehicle has a row of windows in each side thereof and the downwardly extending portion of the second plate portion extends substantially to the level of the upper ends of such row of windows.

6. An extrustion as claimed in claim 5 wherein elastomeric seal means is provided along the upper ends of the windows, and the lower edge of the downwardly extending portion of the second, upright plate portion is biased into compressive sealing relation with the elastomeric seal means.

* * * * *